United States Patent [19]
Belmont

[11] Patent Number: 5,819,156
[45] Date of Patent: Oct. 6, 1998

[54] PC/TV USAGE TRACKING AND REPORTING DEVICE

[75] Inventor: Brian V. Belmont, Dallas, Tex.

[73] Assignee: Compaq Computer Corp., Houston, Tex.

[21] Appl. No.: 783,608

[22] Filed: Jan. 14, 1997

[51] Int. Cl.$^6$ ..................................................... H04N 7/16
[52] U.S. Cl. .................... 455/2; 348/1; 348/552; 345/327
[58] Field of Search .................. 455/2, 4.2, 5.1, 455/6.1, 6.2, 6.3; 348/1, 2, 3, 4, 5, 6, 7–13, 552; 395/200.54, 200.48; 345/327; H04N 7/16, 7/173

[56] References Cited

U.S. PATENT DOCUMENTS

| | | | |
|---|---|---|---|
| 5,374,951 | 12/1994 | Welsh | 348/4 |
| 5,497,479 | 3/1996 | Hornbuckle | 395/491 |
| 5,526,427 | 6/1996 | Thomas et al. | 380/20 |
| 5,532,732 | 7/1996 | Yuen et al. | 348/1 |
| 5,590,056 | 12/1996 | Barritz | 364/550 |
| 5,675,510 | 10/1997 | Coffey et al. | 364/514 A |

OTHER PUBLICATIONS

Antonoff, Michael, *The Big–Tube PCTV*, May 28, 1996, three pages from Internet site.
*Gateway 2000 Sells Destination™ Big Screen PC Through Retail Chains*, four pages from Internet site.
*Gateway 2000 launches Destination™ big screen PC featuring 31–inch monitor*, five pages from Internet site.
*Destination Features*, five pages from Internet site.

Primary Examiner—Chris Grant
Attorney, Agent, or Firm—Jenkens & Gilchrist

[57] ABSTRACT

A TV/PC convergence device, operable in a television mode, a computer mode and a combination television/computer mode, includes a display, a computer and a tracking device. The display receives and displays images in all three modes. The computer executes programs and is operable in the computer mode and the combination television/computer mode. The tracking device, which is coupled to the display and computer, tracks, records, and reports select uses of the display and the computer during each of the television mode, the computer mode and the combination television/computer mode.

5 Claims, 2 Drawing Sheets

PC/TV USAGE TRACKING AND REPORTING DEVICE

FIELD OF THE INVENTION

The present invention relates to PC/TV convergence devices, and more particularly to device for tracking different use aspects of a PC/TV convergence device.

BACKGROUND OF THE INVENTION

A PC/TV convergence device is a fully functional computer integrated with a television, providing TV viewing (via broadcast, cable, Digital Satellite, or other broadcast media) and personal computing functionality. This convergence of computer and television enables a user the combined access to both television program information and computer and Internet information.

Typically a PC/TV convergence device consists of a fully function computer including fax/modems, CD-ROM players, and media storage such as hard drives and floppy drives. The computer is interfaced with a television, often a big screen TV, with the television's NTSC interlaced signal being converted to a scan VGA signal or the computers scan VGA signal being converted to an NTSC interfaced signal. Because the PC/TV convergence device is controlled by the computer's operating system, the PC/TV convergence device can, among other things, display PC applications and TV programs on a single monitor. The convergence of the personal computer and the television into a single device also permits the utilization of the communications bandwidth, mass storage and graphics of the computer to deliver, store and display small applications during a traditional television viewing environment.

The PC/TV convergence device also changes a typical television from just a passive viewing device to a user interactive device. For example, if a user is watching a television program, the PC/TV convergence device will enable the user to download information about that particular program, such as from a web site where additional information about or related to the program might be located.

Because of all of the uses of the PC/TV convergence device, it is highly desirable by television programers and software vendors to be able to get feedback on a users watching of television programs and use of software. Currently, television programmers and software vendors are using passive methods to get feedback as to what the users are watching and using. That is, the users must manually record what television program they watched, for how long, and at what time. Similarly, most of the feedback from software use includes a user calling or e-mailing the vender with a problem, or by the user filling out a product survey. As can be appreciated, there are many problems with these types of use monitoring. For example, the users might only record some of the television programming that they watch, especially when the user does a lot of channel surfing. Similarly, most of the feedback to software vendors is directed solely to problems with the product. However, it is often just as desirable to obtain feedback and use information on all aspects of the product.

SUMMARY OF THE INVENTION

The present invention overcomes the above identified problems as well as other shortcomings and deficiencies of existing technologies by providing a PC/TV convergence device having a tracking device to track, record, and report various uses of the PC/TV convergence device.

The present invention further provides a PC/TV convergence device operable in a television mode, a computer mode, and a combination television/computer mode. The PC/TV convergence device includes a display, a computer and a tracking device. The display receives and displays images in all three modes. The computer executes programs and is at least operable in the computer mode and the combination television/computer mode. The tracking device, which is coupled to the display and computer, tracks, records and reports select uses of the display and the computer during each of the television mode, the computer mode and the combination television/computer mode.

The present invention also provides a computer system having a display, a computer and a tracking device. The display receives and displays images from sources such as a television broadcast, a VCR, and the computer. The computer, which is coupled to the display, executes programs and displays its output on the display. The tracking device, which is coupled to the display and the computer, tracks, records and reports select uses of the display and the computer.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
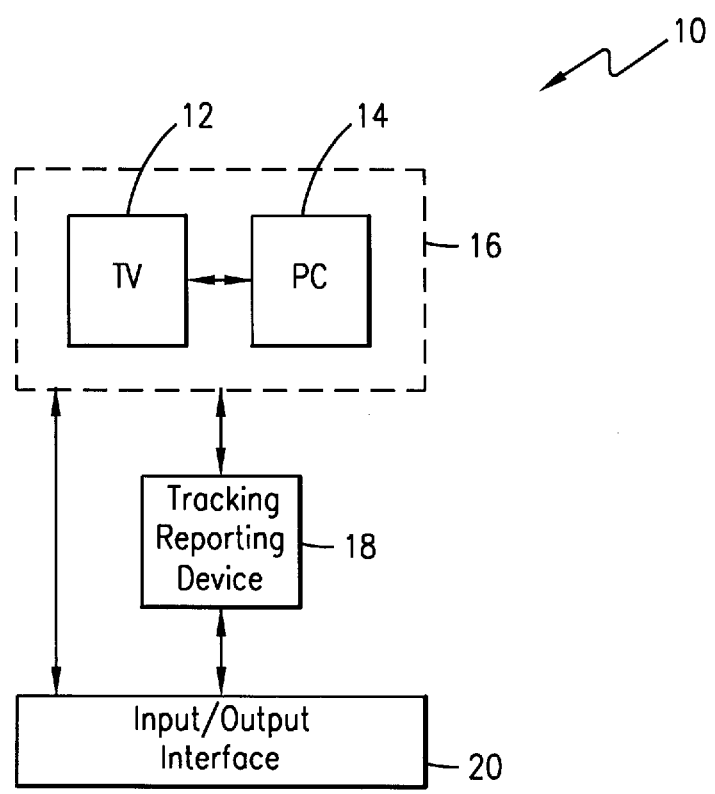
FIG. 1 is a block diagram illustrating a system utilizing the present invention.
Figure 2:
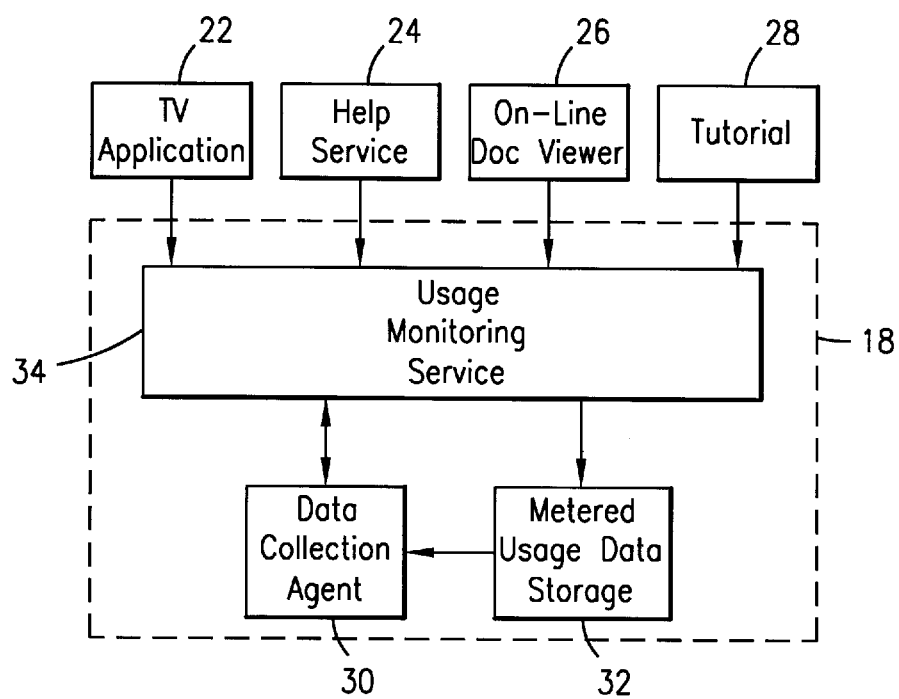
FIG. 2 is a flow control block diagram illustrating the utilization of the present invention.

With reference now to the figures there are depicted block diagrams with FIG. 1 illustrating PC/TV systems in accordance with the utilization of the present invention, and FIG. 2 illustrating a flow control block diagram of the present invention. The purpose of these block diagrams is to illustrate the features of the invention and the basic principles of operation of an embodiment thereof These block diagrams are not necessarily intended to schematically represent particular modules of circuitry or any particular data or control paths.

Referring now to FIG. 1, there is shown a block diagram illustrating a PC/TV convergence system 10. PC/TV convergence system 10 includes a television (TV) 12, a personal computer (PC) 14, which are coupled to form a PC/TV convergence device 16. PC/TV convergence system 10 further includes a tracking/reporting device 18, and an input/output interface 20.

PC/TV convergence device 16 is a standard PC/TV convergence device, and as illustrated includes a television 12 integrated or coupled with a personal computer 14. In general operation, PC/TV convergence device 16 can be operated in various modes. It can be operated in a typical television mode, a personal computer mode, and a combination television/personal computer mode. When PC/TV convergence device 16 is operating in a typical television mode, information is received from TV/video/data source and is displayed on a display or television screen of television 12. When PC/TV convergence device 16 is being operated in the typical personal computer mode, personal computer 14 is utilized to perform typical computer functions such as executing and running software, including playing games, and interfacing with the Internet. Personal computer 14 also displays its output on a display or television screen of television 12.

PC/TV convergence device 16 can also be utilized in a combination mode utilizing the functionality of both the television 12 and the personal computer 14. When operating in the combination mode a user will be able to use the personal computer 14 to interact with the television programs being televised on television 12. For example, during a particular television program a user could download information about that particular program from the Internet. It will also permit a user to watch television while interacting with the operation of the personal computer 14, such as by having a small window displaying a television show or a video on the screen while also displaying the normal personal computer operations on the rest of the screen.

When operating PC/TV convergence device 16 in combination mode, a user can also readily switch between utilizing the personal computer 14 and the television 12. For example during commercials, a user can readily switch from watching a commercial during a television program to utilizing a computer program until the television program resumes whereby the user would switch back to the television.

As further illustrated in FIG. 1, PC/TV convergence system 10 includes an input/output interface 20. Input/output interface 20 is for sending and receiving data to and from PC/TV convergence system 10. Input/output interface 20 is for interfacing with the video source for television 12 and for inputting and outputting data to and from PC/TV convergence system 10 through devices such as to another television, a printer, a modem, an external disk drive, and other computer and television peripherals.

Still referring to FIG. 1, tracking/reporting device 18, which will be described in more detail herein below, generally monitors a users usage characteristics and preferences when using PC/TV convergence system 10. For example, tracking/reporting device 18 can track the channel viewing information of a user. It can collect the actual viewing information, as well as how much time is spent watching television versus other activities.

Referring now to FIG. 2, there is shown a flow control block diagram illustrating a more detailed utilization of the tracking/reporting device 18 of the present invention. As illustrated in FIG. 2, tracking/reporting device 18 includes a usage monitoring device 34, a data collection agent 30, and a metered usage data storage 32. As further depicted, tracking reporting device 18 supports the tracking of multiple applications, such as TV application 22, Help Service 24, On-line Doc Viewer 26, Tutorial 28 and application usage such as games and other programs. It is contemplated that tracking reporting device 18 could be hardware, software or a combination thereof.

In operation, tracking/reporting device 18 can track the usage of TV Application 22. This includes tracking the channels watched by the user, as well as the time spent viewing each of the channels. For TV Application 22, tracking/reporting device 18 can also track the hour-by-hour usage of what channels are watched. Tracking/reporting device 18 can also track which channels or programs were tuned by the user using an Electronic Program Guide. Tracking/reporting device 18 can also track the amount of time a user spent per channel "channel surfing", such as by tracking a channel where a user spends 3–10 seconds per channel. Tracking/reporting device 18 can also track the amount of time spent in picture-in-picture mode.

Still referring to FIG. 2, tracking/reporting device 18 can track the usage of Help Service 24. Help Service 24 could be virtually any type of help file or service. For example it could be a help file for a selected program stored on a hard drive, or could be a on-line help service provided for a product purchased. Tracking/reporting device 18 could track a list of help topics searched, the amount of time spent in a particular help service per visit, and the number of times each topic or service is accessed by a particular user.

As further depicted in FIG. 2, tracking/reporting device 18 can also track the usage of On-Line Doc Viewer 26. An example of an On-Line Doc Viewer would be a web page. Tracking/reporting device 18 could track the list of topics searched, the amount of time spent in each on-line document per visit by a user, and the number of time a given topic is accessed.

Still referring to FIG. 2, tracking/reporting device 18 can further track Tutorial 28. A tutorial could be virtually any type of tutorial, such as a tutorial supplied with a program or an on-line tutorial for a program or a web page. Tracking/reporting device 18 could track the number of times a particular tutorial is accessed, how much of the tutorial a user uses per access, and the amount of time spent in the tutorial.

Although good results have been achieved with the present invention tracking the usage of the above described applications, it is contemplated to be within the scope of this invention that virtually any application and usage of a PC/TV convergence device could be tracked.

Still referring to FIG. 2, metered usage data storage 32 stores the data corresponding to usage for all of the applications being tracked or monitored. Good results have been achieved using a hard drive in TV/PC convergence device to store this information. However, the information could be stored in any type of memory storing device including static RAM, and even a floppy disk.

Usage monitoring service 34 provides a common data logging interface to store the usage information for each of the instrumented applications to be tracked by interfacing with data collection agent 30 and metered usage data storage 32. Usage monitoring service 34 further performs time stamps of the usage data, start and stop duration clocks used to determine the amount of time spent in a giver area, and log data.

Data collection agent 30 provides an interface to a remote data collection service which retrieves the stored usage data in metered usage data storage 32. When a user connects with a data collection agency, data collection agent 30 is queried to determine if any new data has been stored. If it has the user will be asked for permission to provide the newly acquired information to the data collection agency. If permitted to do so, the data collection agency will then retrieve the data and set a flag in the users file indicating the time and date of collection for future reference.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing form the spirit of the invention as set forth and defined by the following claims.

What is claimed is:

1. A PC/TV convergence device operable in a television mode, a computer mode, and a combination television/computer mode, said PC/TV convergence device comprising:

a display for receiving and displaying images;

a computer coupled to said display, said computer for executing programs and for generating images to be displayed on said display, said computer operable at least in the computer mode and the combination television/computer mode; and a tracking device coupled to said display and said computer, said tracking device for tracking select uses of said display and said computer during each of the television mode, computer mode and the combination television/computer mode.

2. The PC/TV convergence device as recited in claim 1, wherein said tracking device includes a data storage device for storing data corresponding to the tracking of select uses of said display and said computer during each of the television mode, computer mode and the combination television/computer mode.

3. The PC/TV convergence device as recited in claim 2, wherein said tracking device further includes a time stamp device for generating time and date information corresponding to said data storage device storing data.

4. The PC/TV convergence device as recited in claim 3, wherein said tracking device further includes a clock for generating starting and stopping information corresponding to said tracking device starting and stopping the tracking of the select uses.

5. The PC/TV convergence device as recited in claim 4, wherein said tracking device further includes an interface for interfacing said data storage device with a data collection agent so that the data collection agent can retrieve said data stored in said data storage device.

* * * * *